(12) United States Patent
Daily, III

(10) Patent No.: US 8,398,840 B2
(45) Date of Patent: Mar. 19, 2013

(54) CAPACITIVE DE-IONIZATION ELECTRODE

(75) Inventor: William D. Daily, III, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 949 days.

(21) Appl. No.: 12/183,331

(22) Filed: Jul. 31, 2008

(65) Prior Publication Data

US 2010/0025247 A1 Feb. 4, 2010

(51) Int. Cl.
*B01D 57/00* (2006.01)
(52) U.S. Cl. .................................................... 204/554
(58) Field of Classification Search .................. 204/554, 204/660, 674
See application file for complete search history.

(56) References Cited

U.S. PATENT DOCUMENTS

| | | | | |
|---|---|---|---|---|
| 5,425,858 | A * | 6/1995 | Farmer | 204/450 |
| 6,309,532 | B1 * | 10/2001 | Tran et al. | 205/687 |
| 2004/0188246 | A1 | 9/2004 | Tran et al. | |
| 2007/0095670 | A1 * | 5/2007 | McLachlan et al. | 204/551 |
| 2007/0246367 | A1 * | 10/2007 | Fan | 205/43 |
| 2008/0009211 | A1 * | 1/2008 | Himes et al. | 442/181 |
| 2009/0020430 | A1 * | 1/2009 | Yang et al. | 204/660 |

FOREIGN PATENT DOCUMENTS

WO   WO 01/90443 A1   11/2001

OTHER PUBLICATIONS

Jung, et al., "Capacitive deionization characteristics of nanostructured carbon aerogel electrodes synthesized via ambient drying", ScienceDirect, 216, pp. 377-385 (2007).

* cited by examiner

*Primary Examiner* — Luan Van
*Assistant Examiner* — Steven Rosenwald
(74) *Attorney, Agent, or Firm* — John P. Wooldridge

(57) ABSTRACT

An electrode "cell" for use in a capacitive deionization (CDI) reactor consists of the electrode support structure, a non-reactive conductive material, the electrode accompaniment or substrate and a flow through screen/separator. These "layers" are repeated and the electrodes are sealed together with gaskets between two end plates to create stacked sets of alternating anode and cathode electrodes in the CDI reactor.

12 Claims, 5 Drawing Sheets

CAPACITIVE DE-IONIZATION ELECTRODE

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to capacitive deionization technology, and more specifically, it relates to capacitive deionization (CDI) electrode fabrication and CDI reactor configurations that reduce capitol costs, increase efficiency, and enable the replacement of electrode surface accompaniments.

2. Description of Related Art

Capacitive deionization is a technology developed to remove ions in solution by bringing the solution between two electrodes of opposite charge. The positive ions are attracted and migrate to the negative electrode material, and the negative ions behave similarly with the positive electrode. Several different approaches to this technique have been proposed (and patented by J. Farmer, M. Andelman and others).

One key to effective treatment using capacitive de-ionization is maximizing the surface area of the electrode surface material. A larger electrode surface area increases the number of locations or sites to which ions may attach. As the available attachment sites fill, the efficiency of ion removal decreases. In an effort to maximize electrode surface area, several materials (e.g., carbon aerogel) have been used as electrode surface accompaniments; however, many other electrode surface materials have yet to be tested.

Another key element in the CDI approach is the maintaining of electrode integrity. Electrode material in the presence of an electrical field and a conductive solution will tend to oxidize at the cathode and reduce at the anode causing rapid reduction of electrical and/or mechanical properties and introduction of the electrode material (e.g., Cu, Fe) into solution. Materials that resist degradation are typically precious metals like gold, and titanium. Past experiments by Farmer have utilized titanium electrodes with carbon aerogel epoxied to the surface.

As with most applications being developed for commercial use, capitol costs play a major role in determining technology efficiency. The electrode substrate material used during development of CDI at Lawrence Livermore National Laboratory (LLNL) was epoxied to the surface of the titanium electrodes. This process is time consuming and may affect the performance of the carbon aerogel due to the seepage of epoxy within the aerogel matrix. Also, titanium is expensive and, without being isolated, posed an increased risk of short-circuiting between electrodes and a shock hazard.

Prior designs for capacitive de-ionization (CDI) (by Farmer) have specified the use of titanium plates with a high surface area substrate material attached to the surface to be used as the electrodes. This was an appropriate design for the initial testing but it had some drawbacks. Titanium is expensive. The electrodes required extensive machining. Adhering the substrate material to the titanium surface was time consuming, and may have resulted in a reduction in surface area due to infiltration of the epoxy within the substrate matrix. There was a high risk of short-circuiting between electrodes and a shock hazard if any metal object touched the CDI reactor.

It is desirable to provide a new electrode design that uses less expensive materials, has a reduced fabrication costs, allows for easy replacement of electrode substrate material without the use of glue and has a configuration that is intrinsically safer.

SUMMARY OF THE INVENTION

It is an object of the present invention to provide new electrode designs that use less expensive materials, have reduced fabrication costs, allow for easy replacement of electrode substrate material and have configurations that are intrinsically safer than provided in the prior art.

This and other objects will be apparent based on the disclosure herein.

The new electrode support structure for CDI incorporates standard circuit board technology which has been tailored to create an electrode that resists corrosion, is commercially (and inexpensively) fabricated, is easily assembled, reduces the risk of short circuiting, and allows for replacement of electrode substrate material. Typical circuit boards (and the prototype electrode supporting structure referenced in this application) are fabricated with fiberglass-reinforced resin with a metal clad conductive surface. The conductive surface is linked to a tab on the edge of the electrode used for connecting to the power source.

The configuration of the new electrode "cell" consists of the electrode support structure, a non-reactive conductive metal cladding, the electrode accompaniment or substrate and a flow through screen/separator. These "layers" are repeated and the electrodes are sealed together with gaskets between two end plates to create stacked sets of alternating anode and cathode electrodes in a reactor.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention provides new electrode fabrication and reactor configurations that reduce capitol costs, increase efficiency, and enable the replacement of electrode surface accompaniments. The new electrode support structures incorporate standard circuit board technology which has been tailored to create an electrode that resists corrosion, is fabricated commercially (and inexpensively), is easily assembled, reduces the risk of short circuiting, and allows for easy replacement of electrode substrate material. The electrode supporting structure can be made, e.g., of fiberglass-reinforced resin with a metal clad conductive surface. This is typically referred to as "FR4" PCB board in the circuit board industry. The conductive surface extends to the edge of the board in one or more locations to facilitate the connection of electrical power. The configuration of the new electrode "cell" consists of the fiberglass electrode support structure with the metal cladding (typically copper, but may be nickel, gold or other metal), the electrode accompaniment and a flow through screen/separator. These "layers" which are repeated and sealed together with gaskets to create stacked sets of alternating anode and cathode electrodes between end plates constitute a reactor. An electrical potential is placed across alternating electrodes and fluid is forced under pressure to flow between each electrode along a serpentine pathway. This approach to electrode materials, design and configuration can replace expensive titanium electrodes in existing capacitive de-ionization flow-through cells for the decontamination of liquids (de-ionization of liquids). It also enables the testing of multiple electrical substrate materials and replacement of worn material. Fabrication and assembly can be automated to a large degree by utilizing standard circuit board manufacturing processes and equipment. The risk of short-circuiting and the weight of the CDI cell are reduced. The present invention enables cost efficient electrode designs for commercial or research applications.

As part of a type of CDI treatment process, an electrical potential is placed across the alternating electrodes. Ions in the process solution are attracted to the electrodes and are held there under electrostatic forces within the substrate. Fluid flows into the reactor through the port on the end plate of the reactor and through slots machined through each electrode supporting structure creating a serpentine flow path. "Clean" fluid is emitted from the effluent port of the reactor. When the electrode substrate requires replacement, the end plates are removed and the various layers comprising the reactor are un-stacked and the cell is reconfigured.

Figure 1A:
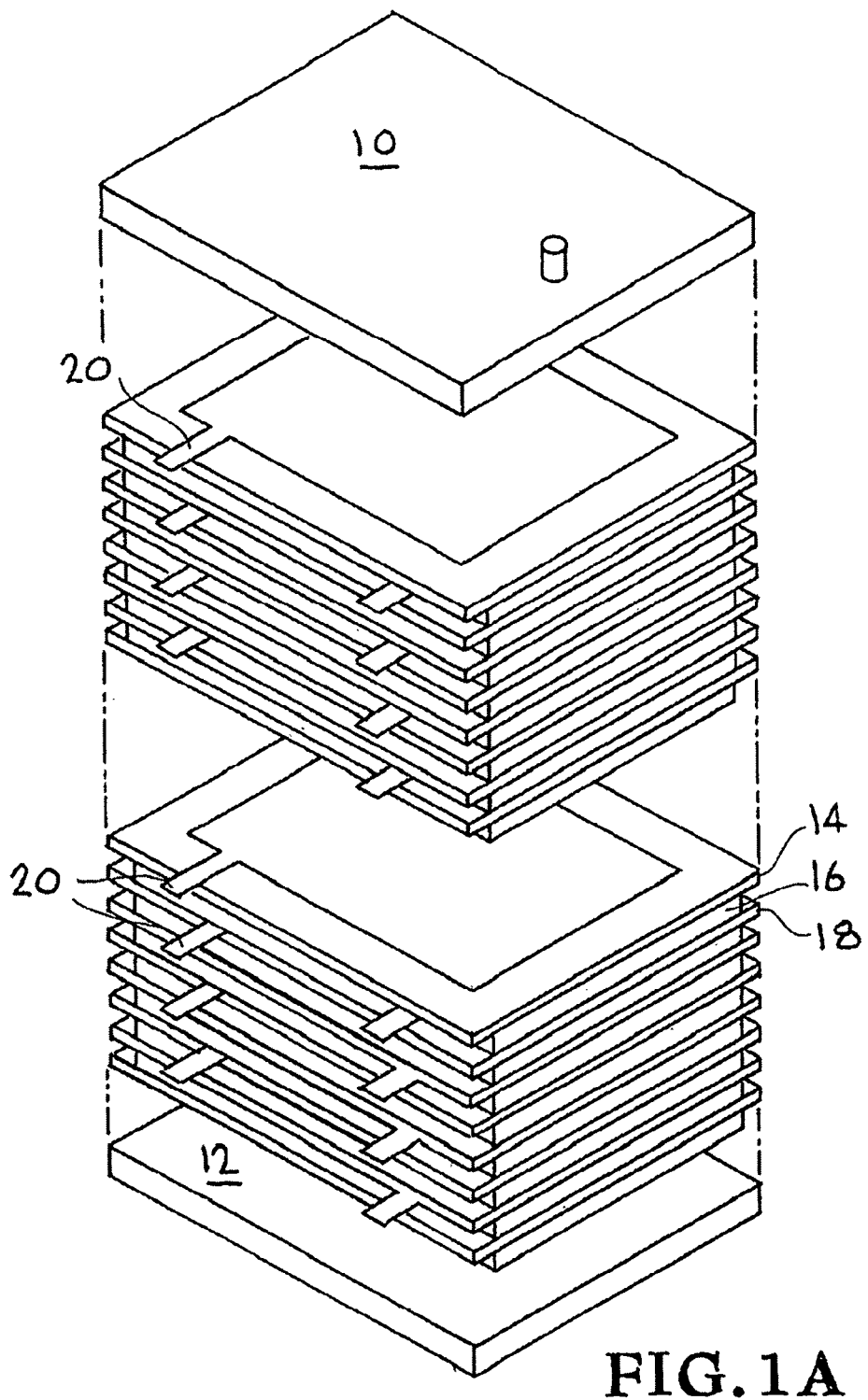
FIG. 1A is an oblique view of an embodiment of the present invention and includes sets of alternating anode and cathode electrodes between end plates, which altogether constitute a reactor.

FIG. 1A is an oblique view of sets of alternating anode and cathode electrodes between end plates 10 and 12, which altogether constitute a reactor. For illustrative purposes, the end plates are shown separated from the sets of alternating anode and cathode electrodes; however, the end plates contact the electrodes in the assembled reactor. Note anode electrode 14, gasket 16, cathode electrode 18, and conductive leads 20.

Figure 1B:
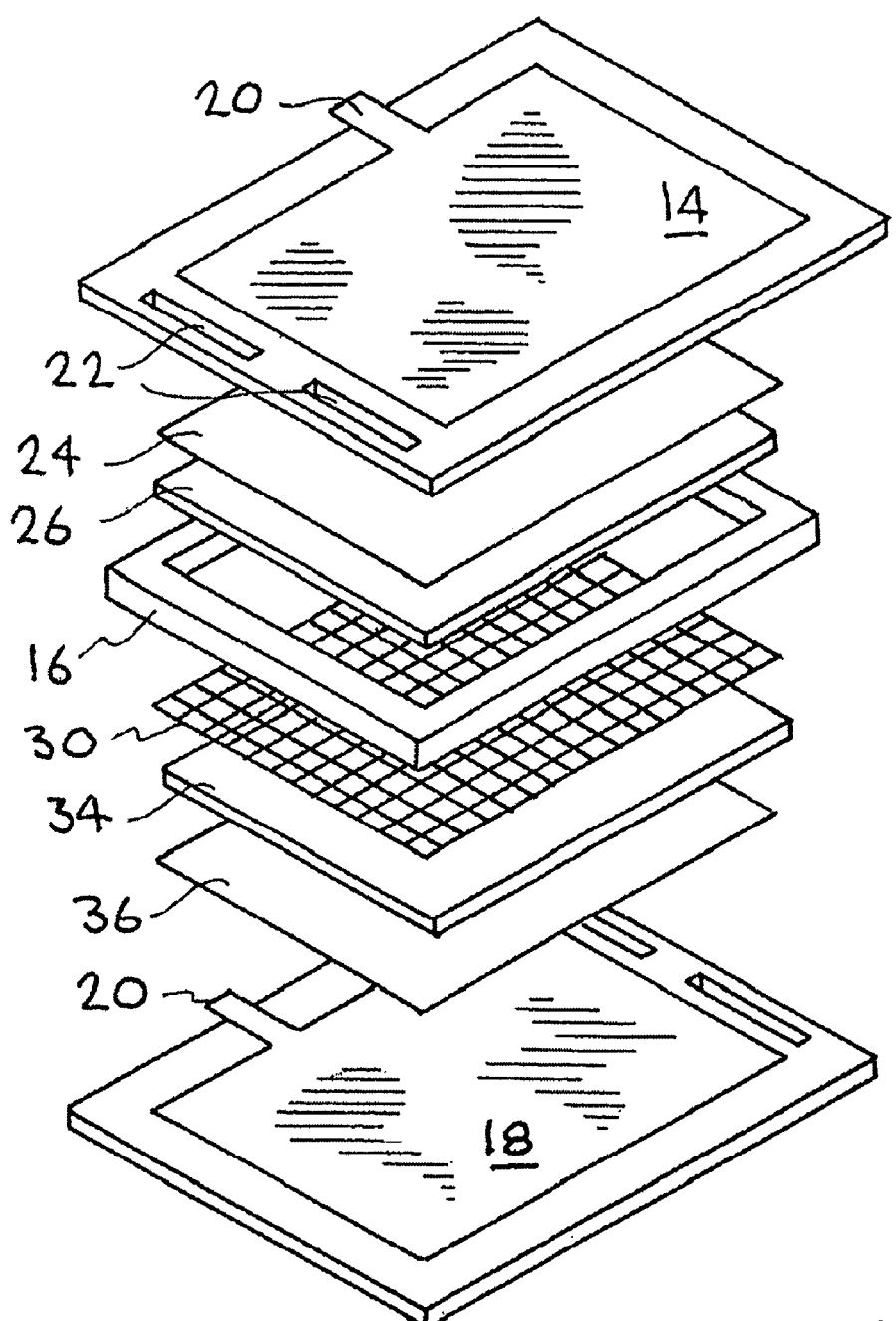
FIG. 1B shows an expanded oblique view of an anode electrode, gasket and cathode electrode of FIG. 1A.

FIG. 1B shows an expanded oblique view of the anode electrode 14, gasket 16 and cathode electrode 18 of FIG. 1A. In this embodiment, the electrode 14 is designated to be the anode and includes conductive lead 20 and flow through channels 22. A non-reactive foil 24 and an anode substrate 26 are positioned between the anode electrode 14 and a gasket 28 so that liquid can flow between the flow through channels 22 and a flow through screen 30. Cathode electrode 18 includes conductive lead 20 and flow through channels 32. A cathode substrate 34 and a non-reactive foil 36 are positioned between gasket 16 and cathode electrode 18 to allow liquid flow between the flow through screen 30 and flow through channels 32.

Figure 2:
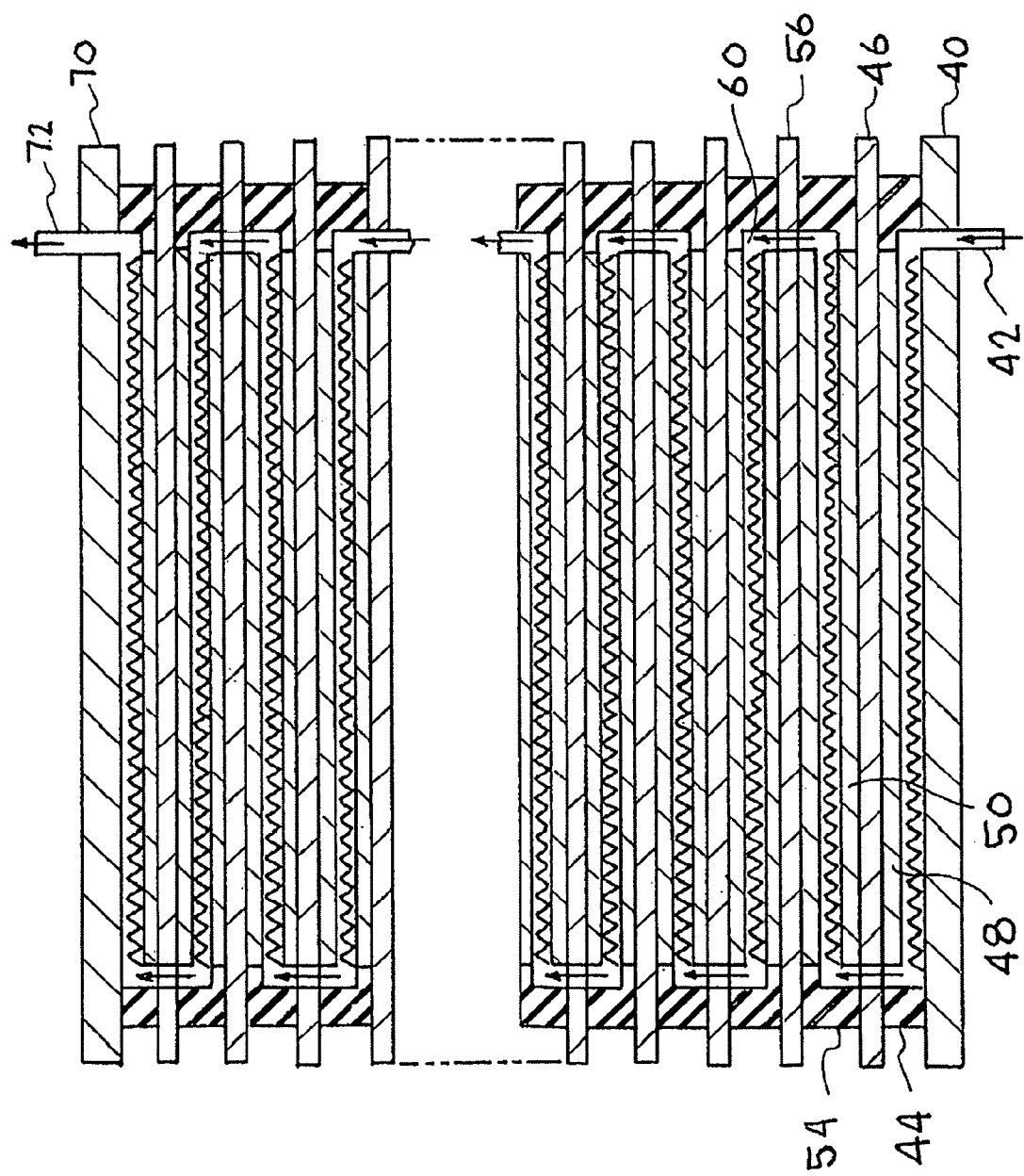
FIG. 2 shows a cut-away side view of a CDI reactor according of the present invention.

FIG. 2 shows a cut-away side view of a present CDI reactor. In this embodiment, endplate 40 includes an inlet port 42. A gasket 44 is adjacent to endplate 40. The next layer 46 adjacent to gasket 44 could be either an anode electrode or a cathode electrode, which would define the remaining layers. In this example, this layer is designated as the anode electrode 46. A material operating to increase ion removal capacity is adjacent to the bottom and top side of anode electrode 46. This layer was referred to in the embodiment of FIG. 1B as the anode substrate. In this example, the layers adjacent to the bottom side and top side of anode electrode 46 are respectively referred to as anode substrate 48 and 50. A flow through screen is placed between end plate 40 and anode substrate 48.

Anode substrate 48 must make electrical contact with anode electrode 46. This can be accomplished e.g., by adhering anode substrate 48 to anode electrode 46 with a conductive adhesive. In another embodiment, an adhesive is not used and flow through screen holds the anode substrate 48 against the anode electrode 46. Alternate attachment or connecting means will be apparent to those skilled in the art based on this disclosure. Note that the anode substrate 48 is placed so that there its top right corner is contiguous with the gasket 44 and anode electrode 46. The anode substrate 48 has a size such that when it is placed as noted above, an opening is defined between the inlet port 42 and the flow through channel 52 of anode electrode 46.

FIG. 1B shows an expanded oblique view of the anode electrode 14, gasket 16 and cathode electrode 18 of FIG. 1A. In this embodiment, the electrode 14 is designated to be the anode and includes conductive lead 20 and flow through channels 22. A non-reactive foil 24 and an anode substrate 26 are positioned between the anode electrode 14 and a gasket 16 so that liquid can flow between the flow through channels 22 and a flow through screen 30. Cathode electrode 18 includes conductive lead 20 and flow through channels 32. A cathode substrate 34 and a non-reactive foil 36 are positioned between gasket 16 and cathode electrode 18 to allow liquid flow between the flow through screen 30 and flow through channels 32.

Figure 3:
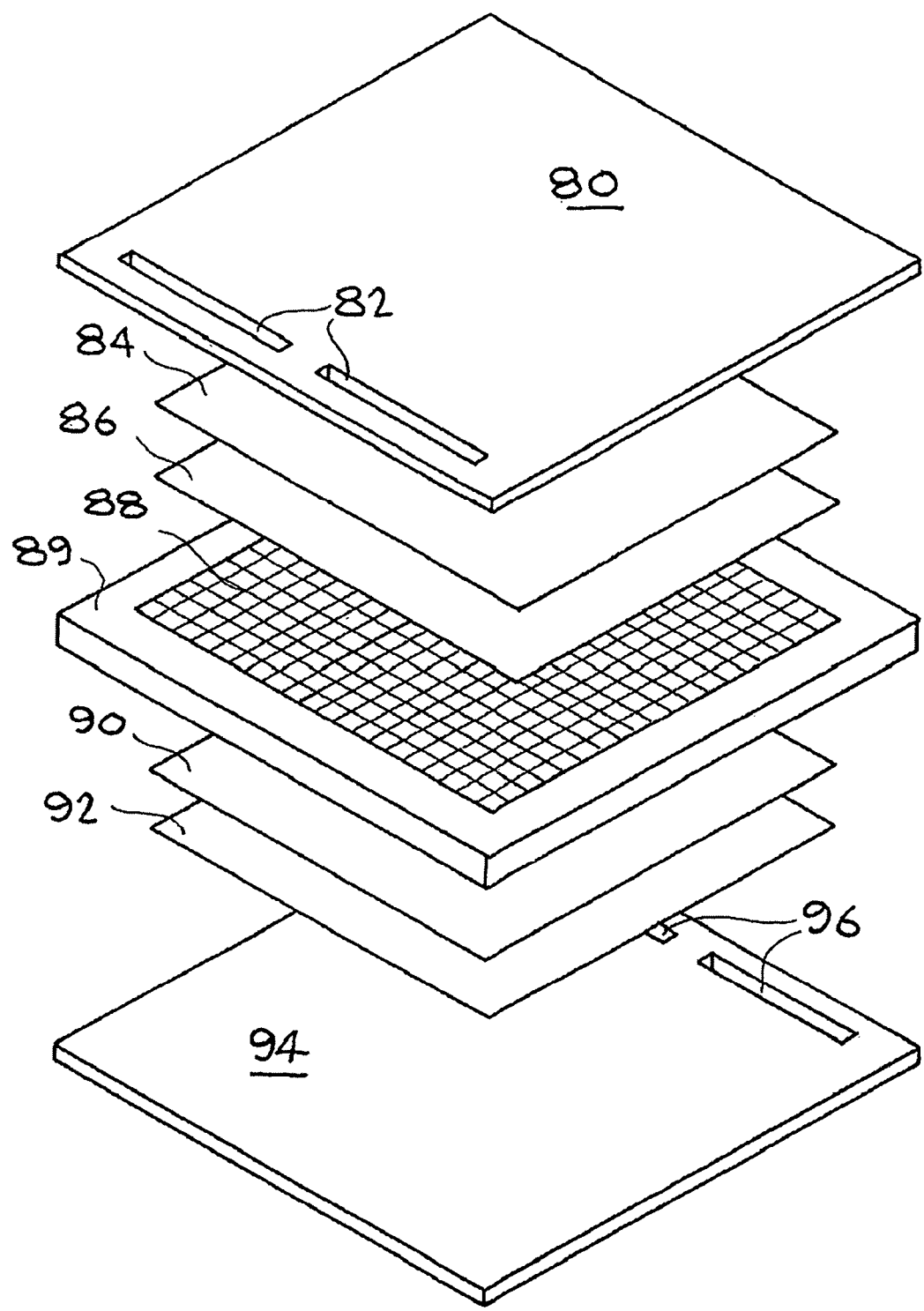
FIG. 3 shows an embodiment of an electrode cell according of the present invention as expanded oblique view of an anode electrode, gasket and cathode electrode of FIG. 1A.

An embodiment of the electrode cell is shown in FIG. 3 and includes a solid anode electrode 80 with flow channels 82, a double sided conductive tape 84, carbon aerogel for use as the anode substrate 86, a flow through screen/spacer 88 held or attached in the central opening of a neoprene gasket 89, another sheet of carbon aerogel operating as a cathode substrate 90, another sheet of double sided conductive tape 92 and a cathode electrode 94 with flow through channels 96.

Figure 4:
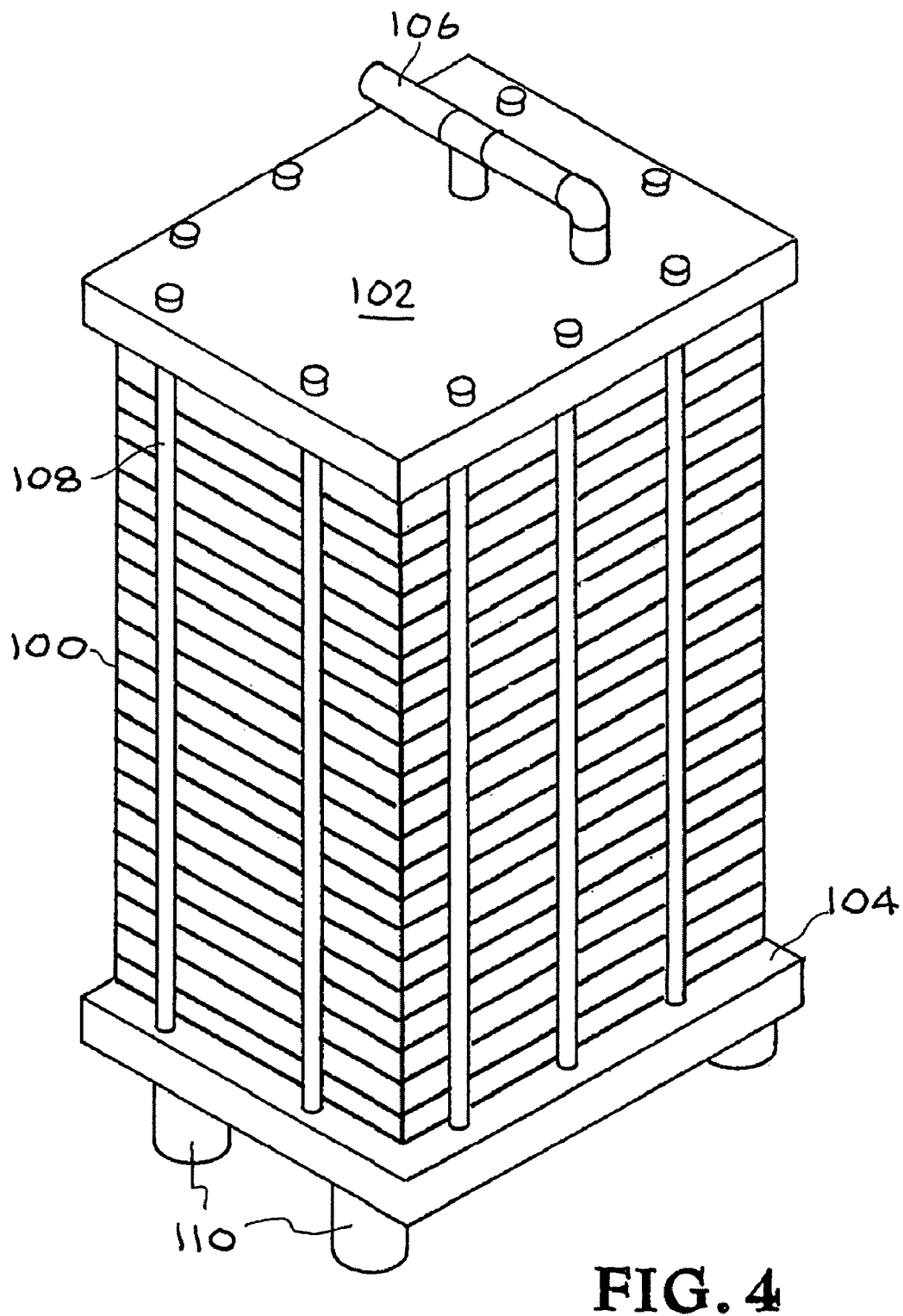
FIG. 4 is an oblique view of an exemplary reactor of the present invention and includes a plurality of electrode cells between a top endplate and a bottom endplate.

FIG. 4 is an oblique view of an exemplary reactor that includes a plurality of electrode cells 100 between a top endplate 102 and a bottom endplate 104. The outlet port 106 is visible in this view. Steel rods 108 with threaded ends are attached between the two endplates to hold the reactor together. The bottom endplate is affixed to a stand 110. The inlet port is not visible.

It is within the scope of this invention to provide other electrode substrate materials. A basic requirement is that such materials enable the increased ion removal capacity of the system. The parameters of interest include surface area, pore sizes, chemical reactivity, electrical conductivity, double layer characteristics and cost of material. Changes in the fiberglass board cladding can be made to reduce cost and increase efficiency. Electrode size and spacing may be varied to account for backpressure issues, ion travel distance, and weight considerations. Varying types of electrical connections and configurations may be made for connection to the power source may be utilized to enhance ease of current flow, capacitive power re-utilization and reduction in cost.

A Procedure for Electrode Fabrication

A procedure fabricating an embodiment of the CDI electrodes incorporates many standard circuit board fabrication techniques and materials. The basic material is sometimes referred to as an "FR4" board (there are many variations to this designation that account for material type and specification). They typically consist of a resin-epoxy sheet that is overlaid on both sides with a thin copper veneer (with other metal cladding applications possible). Initial dimensions are often as large as 36 inches by 48 inches by $\frac{1}{16}$" thick. These dimensions, and the weight of metal cladding, can vary somewhat depending on need and supplier. This basic platform is then modified as to size and amendments (etching, masking, machining) to suite a specific design criteria. Many circuit board fabrication shops employ tools and techniques that enable efficient and effective modifications these boards.

The procedure for modifying the base FR4 boards for use as CDI electrodes may include the following steps:

1. The FR4 boards are trimmed to the dimensions of the desired electrode. These dimensions are determined by the desired flow through capacity, the influent concentrations and required effluent concentrations as well as the spacing of the electrodes and the current flow between them. There is no size restriction, however typical sizes are limited on weight and pressure restrictions. To date, 9.5"×5.5"×0.062" electrodes and 24"×36"×0.062" electrodes have been fabricated.

2. The machining operations are carried out to provide flow through slots, electrical connections, and to make other allowances for hardware. The flow-through slots are required to enable the flow of fluid between the electrodes. Other machining may facilitate fabrication of the reactor, provide easier electrical connections or integrate reactor hardware. For example, the first generation of electrodes incorporated an electrical connection formed from the machining of a tab that extended from one edge of the electrode. Alternately, electrodes may have holes machined that would aid in alignment of the electrodes when they are assembled to create the reactor.

3. The copper cladding is overlayed with additional metal or alloy cladding, conductive adhesive and substrate. As advancements are made in the area of capacitive deionization, the materials used to overlay the copper may vary.

4. Etching removes unneeded copper cladding. This makes the electrodes safer and less prone to short circuits be eliminating the copper from around the edges of the electrode and limiting it to where it is needed.

5. The edges and other areas that should not be exposed to the liquid being treated are solder masked. This shields exposed copper or other surface materials from the process liquid.

The Other Materials Included in the CDI Units May Include:

1. Mesh spacers can be placed between the electrodes to allow fluid to pass between them while keeping them from touching. The screen material is made of polyethylene or some other plastic. It is a woven pattern that allows the water to flow through the material in the direction of the plane of the material. It is commercially available and comes in various thicknesses.

2. End plates are the structural support that keep the electrodes together, the gaskets compressed and liquid contained, as well as to contain the pressure generated within the reactor. They also include the entrance and exit connections for the process fluid.

3, Gaskets that are placed between the electrodes seal the process fluid within the reactor.

4. Retaining hardware are typically threaded rods that hold the electrodes between the end plates. They are designed to hold the pressure of the gasket compression and process flow pressure.

An Assembly Procedure of the Various CDI Components Includes:

1. The electrodes are fabricated by circuit board shops, machine shops, paint shops and/or by hand as described above.

2. The electrodes, gaskets, and end plates are stacked. This is done to insure that the flow path between the electrodes is serpentine and hydraulically efficient.

3. The retaining hardware ties the electrode/end plate stack together.

Some Alternate Materials

The materials for the CDI reactor may change over time due to advances in the understanding of material properties and their effect on deionization. The endplates have been made of carbon steel and stainless steel. They can be made of a non conductive, light weight material more suitable to the economics of production, safety and weight considerations. The electrode substrate now consists of a high surface area carbon aerogel that maximizes the sites at which dissolved ions may be adsorbed. Other conductive materials may be used that are ion specific, have higher surface areas or varying pore sizes. Other alternate materials usable for various components of the present invention will be apparent to those skilled in the art based on this disclosure.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
   an anode electrode having a first port;
   an anode substrate in electrical contact with, said anode electrode, wherein said anode substrate comprises carbon aerogel;
   a cathode electrode having a second port;
   a cathode substrate in electrical contact with said cathode electrode, wherein said cathode substrate comprises carbon aerogel;
   a flow through screen located between said anode substrate and said cathode substrate, wherein said flow through screen holds said anode substrate against said anode electrode and wherein said flow through screen holds said cathode substrate against said cathode electrode; and
   a liquid flow path between said first port and said second port, wherein said liquid flow path allows liquid to flow through said flow through screen and across said anode substrate and said cathode substrate.

2. The apparatus of claim 1, wherein said anode substrate and said cathode substrate preferentially adsorb at least one specific ion.

3. The apparatus of claim 1, wherein said flow through screen comprises a mesh.

4. The apparatus of claim 3, wherein said mesh comprises plastic.

5. The apparatus of claim 3, wherein said mesh is supported by a neoprene gasket.

6. The apparatus of claim 3, wherein said mesh comprises polyethylene.

7. A method for capacitive deionization (CDI) of a liquid, comprising:
   providing a CDI cell comprising:
   an anode electrode having a first port;
   an anode substrate in electrical contact with said anode electrode, wherein said anode substrate comprises carbon aerogel;
   a cathode electrode having a second port;
   a cathode substrate in electrical contact with said cathode electrode, wherein said cathode substrate comprises carbon aerogel;

a flow through screen located between said anode substrate and said cathode substrate, wherein said flow through screen holds said anode substrate against, said anode electrode and wherein said flow through screen holds said cathode substrate against said cathode electrode; and a liquid flow path between said first port and said second port, wherein said liquid flow path allows liquid to flow through said flow through screen and across said anode substrate and said cathode substrate;

placing an electrical potential across said anode electrode and said cathode electrode; and flowing a liquid to be deionized along said flow path.

8. The method of claim 7, wherein said anode substrate and said cathode substrate preferentially adsorb at least one specific ion.

9. The method of claim 7, wherein said flow through screen comprises a mesh.

10. The method of claim 9, wherein said mesh comprises plastic.

11. The method of claim 9, wherein said mesh is supported by a neoprene gasket.

12. The method of claim 9, wherein said mesh comprises polyethylene.

* * * * *